United States Patent [19]

Vassiliou

[11] Patent Number: 6,012,412
[45] Date of Patent: Jan. 11, 2000

[54] APPARATUS FOR COATING EGG YOLKS AND OTHER ARTICLES

[76] Inventor: Eustathios Vassiliou, 12 S. Townview La., Newark, Del. 19711

[21] Appl. No.: 09/028,238

[22] Filed: Feb. 23, 1998

Related U.S. Application Data

[60] Provisional application No. 60/039,053, Mar. 10, 1997, provisional application No. 60/042,253, Mar. 31, 1997, and provisional application No. 60/052,198, Jul. 10, 1997.

[51] Int. Cl.[7] .............................. A23G 3/20; A23G 3/24; B05C 3/00; A01J 1/10; B05D 1/18
[52] U.S. Cl. ................................. 118/16; 118/26; 118/30; 118/423; 118/425; 426/516; 426/573; 427/430.1
[58] Field of Search .................................. 118/16, 26, 29, 118/30, DIG. 4, 425, 426, 423; 426/104, 512, 516, 518, 519, 520, 573, 576; 427/430.1; 34/184

[56] References Cited

U.S. PATENT DOCUMENTS

| | | |
|---|---|---|
| 895,092 | 8/1908 | Kirby . |
| 2,660,305 | 11/1953 | Labouygues . |
| 3,269,297 | 8/1966 | Hilgeland . |
| 3,650,766 | 3/1972 | Smadar . |
| 4,141,287 | 2/1979 | Becker et al. . |
| 4,409,249 | 10/1983 | Forkner . |
| 5,073,399 | 12/1991 | Vassiliou . |
| 5,151,293 | 9/1992 | Vassiliou . |
| 5,192,566 | 3/1993 | Cox et al. . |
| 5,401,525 | 3/1995 | Vassiliou . |
| 5,520,947 | 5/1996 | Vassiliou . |
| 5,547,358 | 8/1996 | Vassiliou . |
| 5,589,208 | 12/1996 | Vassiliou . |
| 5,589,218 | 12/1996 | Vassiliou . |
| 5,711,805 | 1/1998 | Vassiliou . |

*Primary Examiner*—Laura Edwards
*Assistant Examiner*—J. A. Lorengo
*Attorney, Agent, or Firm*—E. Vassiliou

[57] ABSTRACT

Apparatuses are disclosed and claimed for coating egg-yolks, natural or artificial, preferably in the form of disks. The apparatuses comprise a vessel for containing a first coating liquid, in which the egg yolk disks are dispensed. A preferably continuous belt is synchronized with the dispenser so that the back part of the belt is immersed in the liquid when the egg-yolk is being dispensed, while it rises during the period of time that the dispenser is getting ready to dispense a new egg-yolk, thus transferring the yolk out of the liquid. The belt has preferably perforations in its middle portion and it is pivoted in the vicinity of the front end of the vessel. The apparatuses of the present invention are useful for coating articles other than egg-yolk disks.

20 Claims, 3 Drawing Sheets

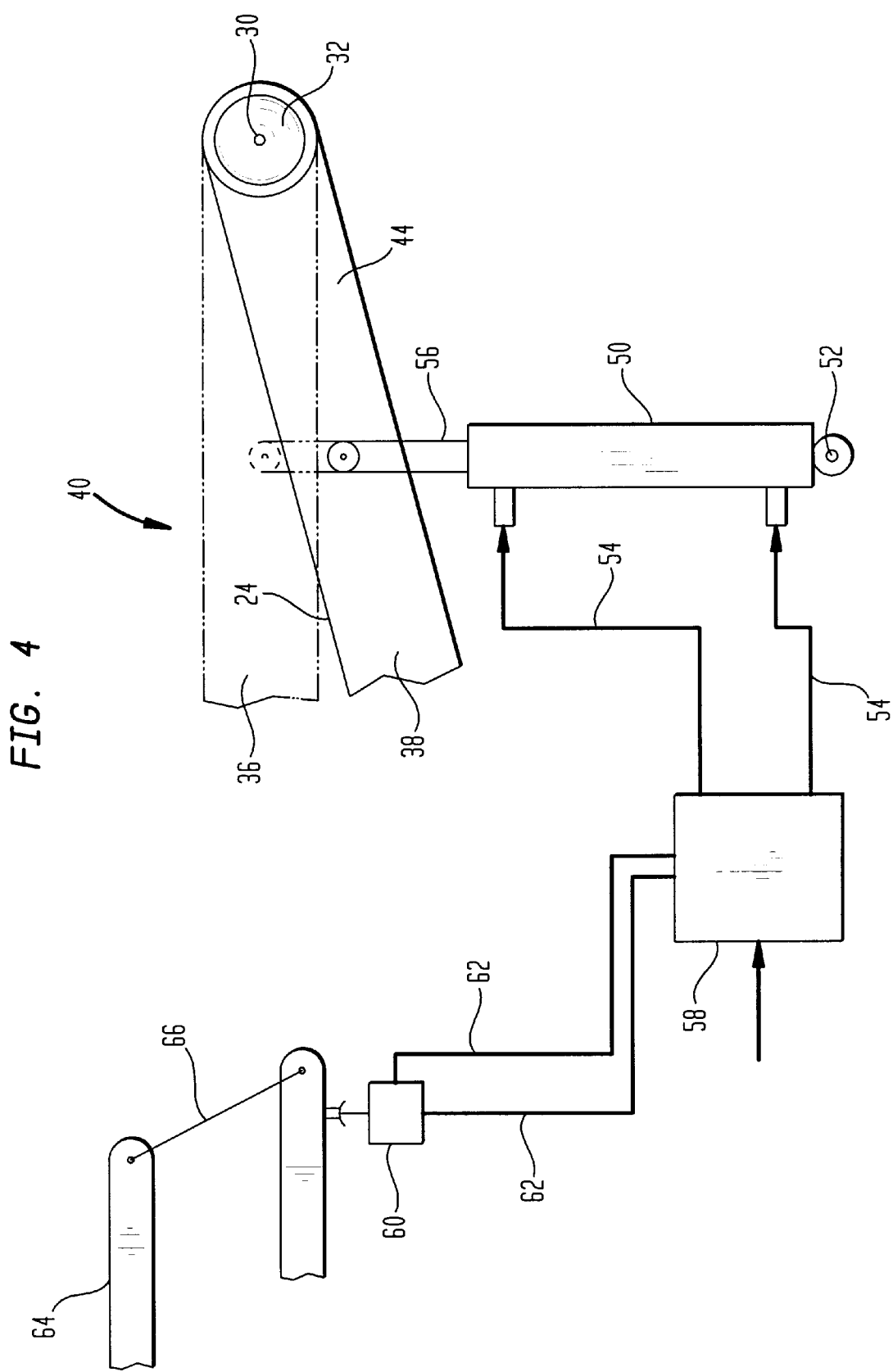

APPARATUS FOR COATING EGG YOLKS AND OTHER ARTICLES

This APPLN claims Benefit of Provisional APPLN Nos. 60/039,053 Mar. 10, 1997, 60/042,253 Mar. 31, 1997, 60/052,198 Jul. 10, 1997.

FIELD OF THE INVENTION

This invention relates to methods and apparatuses for making, cutting into disks, and coating articles and especially artificial egg-yolk disks with a restrictive barrier or membrane.

BACKGROUND OF THE INVENTION

Although eggs represent an outstanding nutritional food which is enjoyed by many people, especially as part of one's breakfast, the fact is that natural egg yolk is one of the richest foods in cholesterol. This has forced a large number of people who are on cholesterol and fat free diets from enjoying eating natural whole eggs. One practical and economically feasible solution has been to incorporate a simulated and preferably a cholesterol free egg yolk into natural egg white and to preserve them in separate phases, so that one can make, for example, a "sunny side up" and "over easy" egg. In this regard, there is known in the inventor's U.S. Pat. No. 5,073,399, which is incorporated by reference herein, a simulated egg yolk and simulated raw whole egg manufactured therewith constituting an edible liquid, a viscosity modifier which is preferably a positive thermoreversible gel former, and a colorant. The simulated egg yolks produced thereby, which may be encapsulated by a hydrocolloid restrictive barrier, are remarkably lifelike and are useful in the preparation of "sunny side up" and "over easy" eggs when disposed in natural egg whites.

The inventor realized that in the preparation of a simulated whole raw egg for use in the production of a natural looking "sunny side up" or "over easy" egg, it is typically necessary to store the simulated egg yolk in a separate gelled phase within liquid natural egg white. It was observed that these simulated egg yolks tend to absorb water from the natural egg white, probably by osmosis, thereby undesirably increasing the weight and volume of the egg yolk. The absorption of water is undesirable because it decreases the viscosity of the egg yolk upon cooking, which adversely results in the reduction of the egg yolk's overall mechanical and/or physical strength, i.e., the ability to remain unbroken and to retain its integrity and shape prior to being purposefully broken after cooking when being eaten. The decrease in viscosity can result in the premature disruption of the structure of the discrete egg yolk when in the molten state, such as during cooking, and uncontrolled running of the egg yolk at serving temperatures may take place. In addition, the reduction in the egg yolk's mechanical and/or physical strength requires that the egg yolk be handled delicately.

In the inventor's U.S. Pat. No. 5,151,293, which is also herein incorporated by reference, a number of possible remedies to overcome these problems of water absorption were proposed. It was observed that the positive thermoreversible gel former used in the production of the simulated egg yolk appeared to be the driving force behind the absorption of water from natural egg white. Although it was proposed to minimize the amount of gel former used, this also had the tendency of producing "delicate" egg yolks whose viscosity will change prematurely such that the egg yolk's monolithic structure is lost during manufacturing and/or handling, including during cooking. Thus, the proposed solution created other problems which were not fully resolved.

Another proposed method of reducing the initial weight gain of a simulated egg yolk, yet maintaining its viscosity and mechanical and/or physical strength, is by the use of a restrictive barrier. Several methods of imparting such a barrier to the egg yolk before being added to liquid natural egg white are described, such as a cross-linked membrane of an edible resin, e.g. an alginate, a pectin, and the like. A multivalent cation, such as calcium or aluminum in the form of a salt may be used as the cross-linking agent. A restrictive barrier can also be formed from hydrateable edible polymeric compounds or hydrocolloids which give rise to substantial instantaneous increase in viscosity as soon as they come into contact with and start dissolving in aqueous systems.

Also disclosed is reducing the absorption of water by adding a solute to the liquid egg white such that smaller osmotic pressure differential will exist between the liquid egg white and the simulated egg yolk. This is expected to minimize the force thought to be driving water into the egg yolk. Finally, the inventor proposed immersing the egg yolk in an aqueous medium which provides an accelerated tendency of the egg yolk to absorb water. In this technique, the egg yolk is formulated with less water than would otherwise be used. The egg yolk is then immersed into water until the degree of water absorption desirable has been achieved. When added to liquid egg white, the thus created egg yolk does not exhibit a strong tendency to further absorb water.

Although the '293 patent mentions forming a restrictive barrier layer from a cross-linked film of an edible resin, there is no reference to a particular method of forming the barrier around an egg yolk. The methods used so far to produce restrictive barriers around simulated egg yolks were both time consuming and cumbersome. For example, Forkner, U.S. Pat. No. 4,409,249, discusses briefly the use of cross-linked hydrocolloids, such as alginates, with calcium salts, as edible membranes around artificial liquid yolks to hold the shape of the egg yolk. Cox et al., U.S. Pat. No. 5,192,566, discloses various detailed methods of forming a restrictive barrier around a simulated liquid egg yolk. In both Forkner and Cox et al. frozen or otherwise immobilized liquid egg yolk is coated with a restrictive barrier forming solution or dispersion such as one containing edible hydrocolloids, for example, sodium alginate. The coated egg yolk is treated to form the restrictive barrier by contact with a reactive composition in the form of a setting bath containing a setting agent, for example, calcium chloride. Cox et al. discusses two alternative methods, the first of which they co-extrude a central yolk portion with a surrounding portion containing the film former, and in the second they include the film former in the formulation of the yolk. In the preferred method of Cox et al., the second method, the restrictive barrier forming compounds are mixed with the egg yolk components in sufficient quantities to form a barrier on the outer surface of the egg yolk when contacted with a setting agent. The liquid egg yolk is extruded in the form of discrete liquid globules into a setting bath. These methods are undesirably time consuming, requiring the yolks to stay in the setting bath for 8–15 minutes, followed by rinsing for about 10–20 minutes.

This conventional process of forming a restrictive barrier in accordance with either Cox et al. or Forkner was found to present a large number of disadvantages resulting in a simulated egg yolk having a poorly formed barrier. A major drawback is the commercially undesirable (which may come to the point of being unacceptable) length of time needed to complete the process. When attempting to use reasonably short times for the conventional process, additional drawbacks, just to mention a few, include, but are not limited to, irreproducibility of the quality of the membrane, thickness variability, openings in the membrane structure, weak regions which may break easily, and tough to chew regions making the consumption of the respective egg unpleasant.

More particularly, the coating of the egg yolk first with a restrictive barrier forming compound often results in a barrier which is not only flimsy, but also not uniform in thickness. When immersed in the setting bath, the restrictive barrier forming compound often does not cross-link uniformly, in particular, in those regions having a thicker layer, thereby requiring extended residence times. In addition, it has been found that in those regions where an excess of restrictive barrier forming compound is present, incomplete cross-linking may still occur, resulting in the barrier layer being relatively weak, and in fact, may be in the nature of a loose slurry. These regions are potential defect sites which can cause the simulated egg yolk to prematurely rupture during handling.

The setting bath which contains the setting agent, for example, calcium chloride being the major representative of setting agent, even at small concentrations is known to have a bitter taste. Any excess setting agent which is retained on the egg yolk will subsequently dissolve in the liquid egg whites into which the egg yolk is deposited. This will result in the finally cooked whole egg having a bitter unpleasant taste which is unacceptable to the consumer. To avoid this problem, it becomes necessary to subsequently subject the egg yolk to an extensive rinse bath which is highly undesirable from the standpoint of both process time and economy.

A further disadvantage is the high probability of a remaining slippery fluid region under the membrane and surrounding the solid at room temperature yolk portion, which fluid region consists of unset or incompletely set film former. All these disadvantages render these processes very delicate, sensitive to unforeseen external parameters, time consuming, and cumbersome. Still more particularly, according to the conventional method, the yolk is dipped into a solution of a film former, which is very viscous even at low concentrations of film former, and therefore it produces an uneven thick film on the yolk. When this film comes in contact with the solution of the setting agent, a thin cross-linked skin is formed at the top of the film, away from the yolk. The skin does not allow easy access to the rest of the trapped film former, and thus, one has to wait for a long time (many minutes) for the setting agent, for example calcium ions, to diffuse through the skin and continue setting the rest of the resin. This increases the thickness of the skin and makes the diffusion process more and more difficult. If one does not wait for all the time required to complete the setting throughout the thickness of the film, there will remain a slippery fluid region under the skin, adjacent to the yolk, rendering the thus far made membrane flimsy and not supported by the non-flowable yolk. Further, since the outermost skin of the membrane will be fully cross-linked, due to the abundance of setting agent in that region, its adhesion to the white will be minimal, if any at all, upon cooking the yolk and coagulating the white. It is a very well known fact that fully cross-linked surfaces are notorious for refusing to adhere to other surfaces, and they may even be used as release structures. Thus, special treatment will be needed to provide adhesion of the membrane to the white.

Since the environment at which the membrane was formed in this case includes an abundance of setting agent, thorough rinsing becomes necessary in order to remove the setting agent (calcium chloride, for example) before the processed yolk is introduced into the egg white. The task of removing the setting agent becomes even more difficult, due to the fact that the portion of setting agent which has been trapped within the fully cross-linked outer part of the membrane, and which travels outward at a very low speed, does not find any uncross-linked sites to be bound, and therefore it has to be substantially removed completely to avoid the undesirable taste and other ailments that may introduce to the white.

None of the aforementioned patents provide a commercially desirable method of manufacturing large quantities of high quality simulated egg yolk and "friable" (either "sunny side up" or "over easy") or "poachable" whole eggs. In the case of U.S. Pat. No. 5,151,293, the problems of commercializable methods are complicated by attempting to balance the complexities of water absorption and the need for a strong, monolithic simulated egg yolk with a highly controlled temperature/viscosity profile (yolk formulated to only become runny and lose its shape when desired).

These problems were solved in Applicant's U.S. Pat. Nos. 5,711,805, 5,589,218, 5,589,208, 5,547,538, 5,401,525, and 5,520,947, which are also incorporated herein by reference, by the provision of a commercially feasible mass production method for the formation of high quality simulated egg yolk is which is extrudable at or below room temperature in accordance with the present invention. The resulting simulated egg yolk, when added to liquid natural egg white and, thereafter, fried, yields a realistic egg in flavor, texture and look. The resulting egg retains a discrete egg yolk, even at serving temperatures, which naturally runs upon being disturbed. Thus, the resulting egg product looks, tastes and behaves as a natural fried or poached egg. However, the disclosed apparatuses and methods of coating yolk disks, either involve a plurality of moving parts, which add complexity, or they still have some sensitivity regarding either occasional incomplete coverage or occasional excessive transfer of coating along with the coated yolk or other article.

U.S. Pat. Nos. 2,660,305 (Labouygues), 3,269,297 (Hilgeland), 3,650,766 (Smadar), and 4,411,287 (Becker et al.), show also miscellaneous coating methods and/or apparatuses.

SUMMARY OF THE INVENTION

This invention relates to apparatuses for coating artificial egg-yolk disks or other articles with a restrictive barrier or membrane. Three of the most important stations to achieve this are (a) a yolk cylinder station, wherein the raw material are mixed, processed, and extruded into a form of a cylinder, (b) a disk cutting station, wherein the yolk cylinder is cut into disks, as it is being extruded, and (c) a coating station, wherein the disks are encapsulated in a membrane, preferably made of an alginate cross linked with a multivalent ion, such as calcium, magnesium, or aluminum, for example.

The coating station of the instant invention pertains to an apparatus for coating an article, the apparatus comprising:

an article dispenser;

a first vessel having an inner space for containing a first coating liquid, the first vessel being in such spatial relation to the article dispenser so as to accept the article within the inner space after the article is dispensed from the article dispenser; and a belt synchronized with the article dispenser in a manner that (a) when the article dispenser dispenses the article, the belt is at least partially immersed in the inner space, (b) after the dispenser has dispensed the article and said dispenser is being prepared to dispense a new article, the belt is lifted so as to transfer the article outside the inner space, (c) the belt is immersed again into the inner space before the dispenser dispenses the new article, and (d) the belt repeats steps (b), (c), and (d).

The belt is preferably a continuous belt. Such a belt may preferably have an upper end and a lower end, the upper end being disposed outside the inner space, the lower end being synchronized with the article dispenser in a manner that (a) when the article dispenser dispenses the article, the lower end is immersed in the inner space, (b) after the dispenser has dispensed the article and said dispenser is being prepared to dispense a new article, the lower end is lifted so as to transfer the article toward the upper end, outside the inner space, (c) the lower end is immersed again into the inner space before the dispenser dispenses the new article, and (d) the lower end repeats (b), (c), and (d).

The belt has preferably a middle portion and two belt side portions. The belt has also preferably perforations. More preferably, the perforations are located in the middle portion, while the two belt side portions are substantially free of perforations.

Preferably, the first vessel has a front end, a back end and two first vessel side portions. More preferably, the apparatus further comprises belt side supports, and the belt side portions are in close proximity with the belt side supports. Further it is even more preferable that the belt side supports are in close proximity with the first vessel side portions at least in the region of the inner space.

Preferably, the front end of the vessel has a lower volume capacity than the back end. Also preferably, the upper end of the belt is pivoted, and more preferably it is pivoted in the vicinity and ahead of the front end of the first vessel.

The apparatus of the present invention may further comprise a second vessel disposed in front of the first vessel for containing a second coating liquid, the second vessel being adapted to accept the article after said article has been transferred outside the inner space of the first vessel.

BRIEF DESCRIPTION OF THE DRAWING

The reader's understanding of this invention will be enhanced by reference to the following detailed description taken in combination with the drawing figures, wherein:

FIG. 4 illustrates a synchronization mechanism for raising and lowering the belt in coordination with the dispensing of egg-yolks.

DETAILED DESCRIPTION OF THE INVENTION

As aforementioned, this invention relates to apparatuses for coating artificial egg-yolk disks or other articles with a restrictive barrier or membrane, as well as eggs containing the coated egg-yolks.

Figure 1:
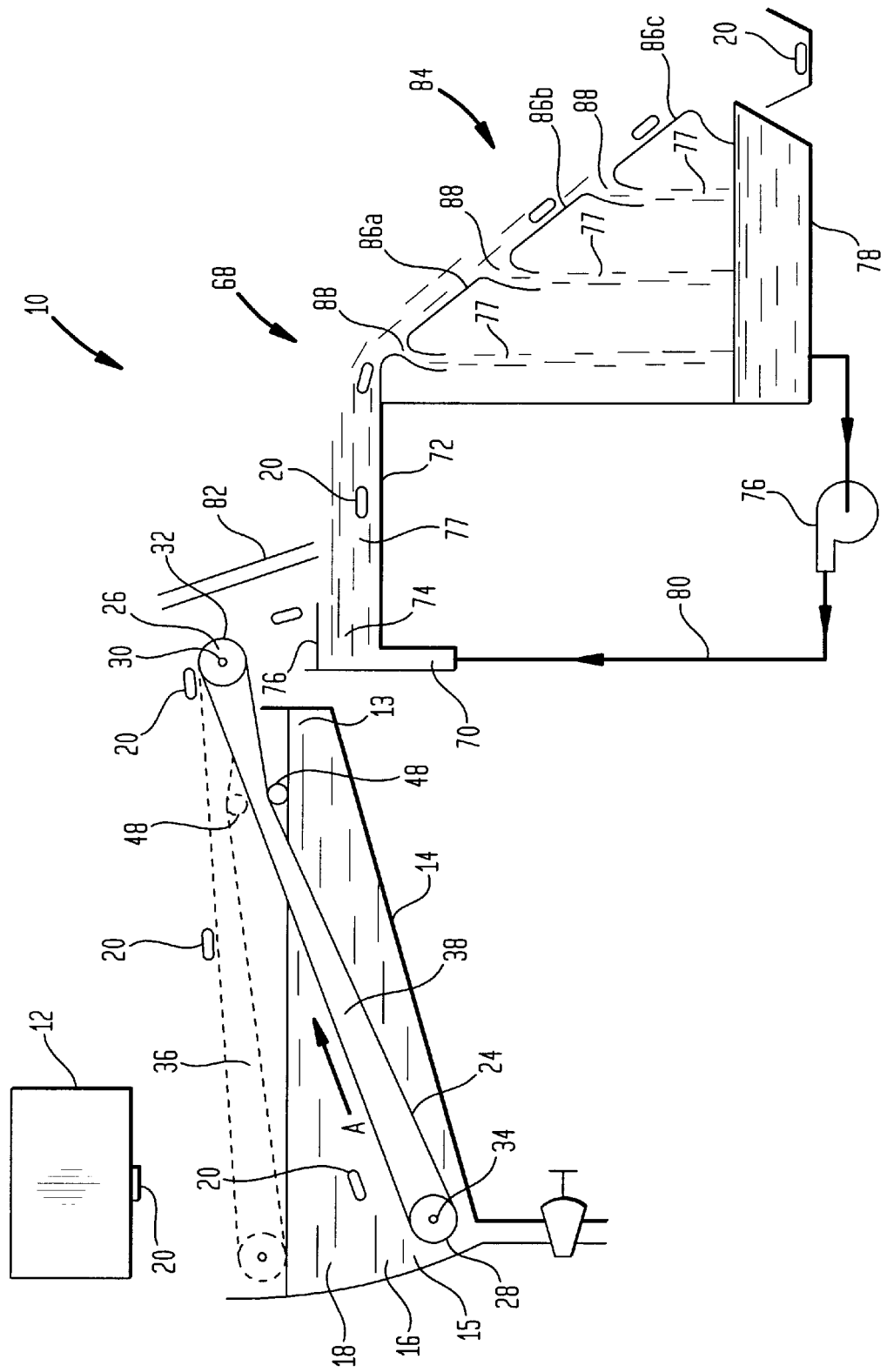
FIG. 1 illustrates an apparatus for coating egg-yolk disks or other articles according to a preferred embodiment of the instant invention.

Referring now to FIG. 1, there is depicted an apparatus 10 for coating an article, such as an egg-yolk for example. The apparatus 10 of a preferred embodiment of the instant invention comprises a dispenser 12 for dispensing the articles to be coated. Such a dispenser, may be for example a yolk dispensing device, wherein a mass of gelled egg-yolk is extruded and cut in the form of disks. Examples of such egg-yolk dispensers are described in detail in U.S. Pat. Nos. 5,520,947, 5,589,218, and 5,589,208. Other examples of dispensers are fish-patty dispensers, as well as other types of dispensers, well known to the art. The preferred types of dispensers according to this invention are extrusion type dispensers wherein the yolk is separated from the dispenser by a cutting wire.

Figure 2:
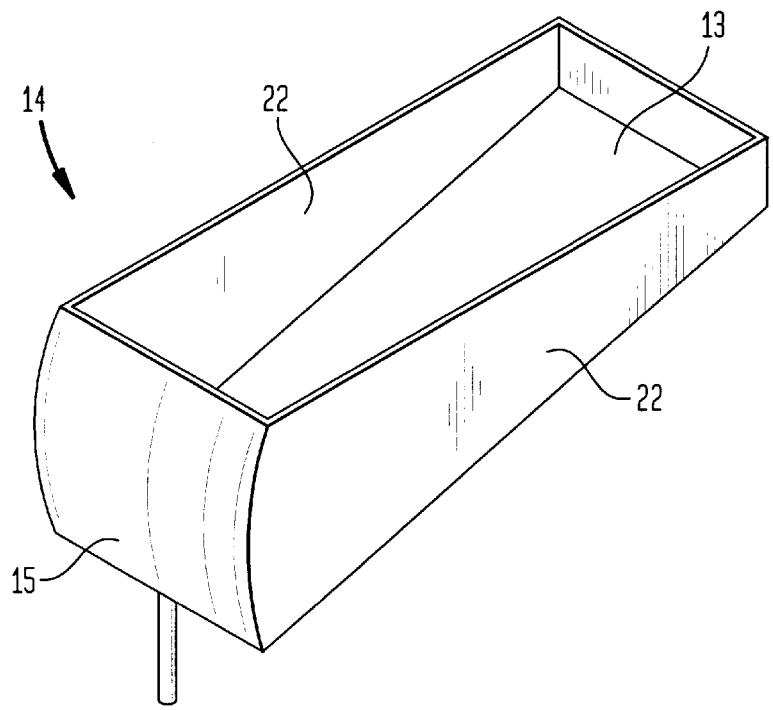
FIG. 2 is a perspective view of the first vessel, which is part of the apparatus of FIG. 1.
Figure 3:
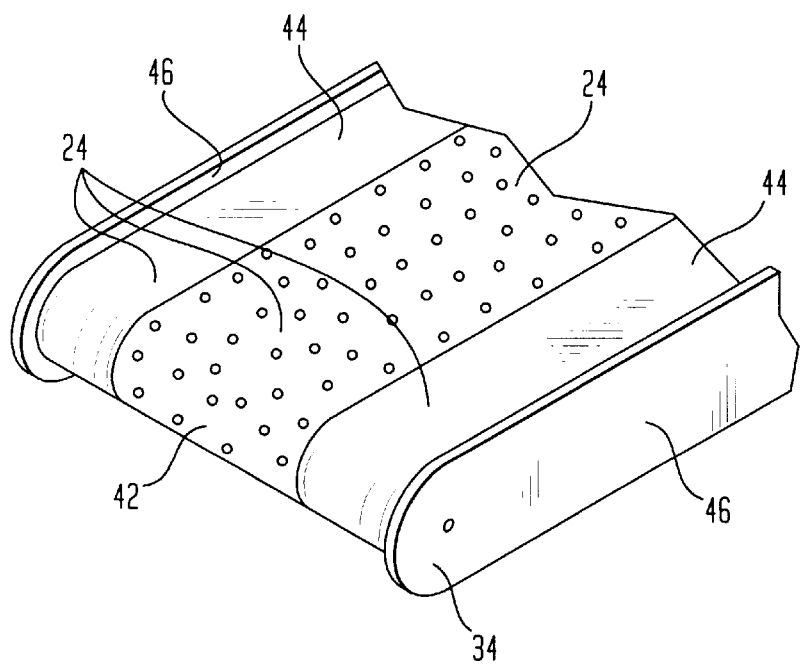
FIG. 3 illustrates a belt for use in the apparatus of FIG. 1 according to another preferred embodiment of the instant invention.

The coating apparatus 10, further comprises a first vessel 14, which has an inner space 16 for containing a first coating liquid 18. The first vessel 14 also has a font end 13 and a back end 15. Preferably, the front end 13 of the first vessel 14 has a lower volume capacity than the back end 15. In other words, the back end 15 of the first vessel 14, may preferably be deeper than the front end 13. The first vessel 14 is in such spatial relation to the article dispenser 12 so as to accept the egg-yolk (or other article) within the inner space 16 and first coating liquid 18 after the egg-yolk (or other article) is dispensed from the article dispenser 12. The first vessel 14 has also two first vessel side portions 22, as better illustrated in FIG. 2.

The apparatus 10 may also comprise a belt 24, preferably continuous, which is at least partially disposed over the first vessel 14. The belt has an upper end 26 and a lower end 28. The upper end 26 of the belt 24 is preferably outside the inner space 16, and even more preferably it is disposed in the vicinity and ahead of the front end 13 of the first vessel 14, as illustrated in FIG. 1. The belt 14 is preferably pivoted around a first pivot 30 at the upper end 26 of the belt 14. The belt 14 is adapted to turn around rolls 32 and 34, disposed at the upper and the lower ends 26, and 28, of the belt 14, respectively, in the direction of arrow A. The belt 14 is also adapted to move upward and downward around the first pivot 30 between upper position 36 and lower position 38 by means of a synchronizer 40 (FIG. 4) to be discussed in detail hereinbelow.

The belt 24 is preferably perforated. More preferably it comprises a middle perforated portion 42 and two belt side portions 44, which are substantially non-perforated. The perforations may be part of a loosely woven material, while the belt side portions 44 may be made of closely woven material or of other substantially non-permeable material. The rolls 32 and 34 (which support the belt 24) are preferably supported in turn by belt side supports 46. More rolls (not shown for purposes of clarity), preferably idle, similar to rolls 32 and 34 are preferably placed along the length of belt side supports 46 to prevent the belt from bowing. Preferably roll 32 is a driving roll for the belt, and roll 34 is an idle roll. A motor (not shown for purposes of clarity) preferably drives the roll 32. The roll 32 has preferably a rough surface, it has an elastomeric surface or comprises elastomeric O-rings to increase friction between the belt surface and the roll surface, and prevent slipping of the belt. Of course, other well known to the art mechanisms, such as for example gears, etc., may be used for driving the belt 24 through roll 32.

A belt deflector 48 may also be used for a multiplicity of reasons, such as for example to stretch the belt 24, or allow the front end 26 of the belt to assume a lower position without touching the walls of the front end 13 of the first vessel 14, etc. Deflector 48 may be, for example, in the form of a roll or in the form of a rod or in the form of a wire.

It is preferable that the belt side portions 44 are in close proximity with the belt side supports 46, and that the belt side supports 46 are in close proximity with the first vessel side portions 22 at least in the region of the inner space.

The apparatus 10 also comprises the aforementioned synchronizer 40, better shown in FIG. 4. The synchronizer 40 comprises a lifter, which may be in the form of an air cylinder 50, pivoted around a second pivot 52 at one end and engaged to at lest one of the belt side supports 44 at the other end through a piston 56. The air cylinder 50 is connected to air-lines 54 which may push the piston 56 up or down by well known to the art techniques, so that the belt is forced to assume position 36 or position 38 as the piston is expanded or retracted, respectively. The airlines 54 are controlled by controller 58, which receives input information from a sensor through input lines 62. The sensor 60 may be a photosensor, a proximity sensor, a simple on-off switch or any other device which can give information to the controller 58 that the dispenser is ready to dispense an article immediately, such as an egg-yolk in the form of a disk, for example, or the condition that the dispenser being prepared to dispense the article, but it is not ready to dispense it immediately, or any other relevant information regarding the dispenser and its operation status. In the case that the dispenser is a yolk extruder, and it comprises a wire system 64, having a wire 66, in a manner that the wire system is caused by the dispenser to move in a way that the wire may cut and liberate a yolk to fall into the inner space 16 of the first vessel 14, the movement of the wire system 64 may give information to the controller 58 through sensor 60 and input lines 62 regarding the dispensing status of the egg-yolk. It should be noted that it is not necessary that the controller is activated by an external sensor as described above. The same mechanism that controls the dispenser to be at a certain status versus time, may also activate or deactivate the controller, accordingly, by well known to the art techniques.

It is important that:
(a) when the article dispenser dispenses the article, such as an egg-yolk 20 for example, the lower end 34 of the belt 14 is immersed or is being immersed in the inner space 16, so that the belt 14 assumes the lower position 38;
(b) after the article dispenser has dispensed the article, such as an egg-yolk 20, for example, and the dispenser is being prepared to dispense a new article, the lower end 34 is lifted so as to transfer the article toward the upper end, outside the inner space 16, at which point the belt has assumed the upper position 36;
(c) the lower end 34 is immersed again into the inner space 16 before the dispenser dispenses the new article; and
(d) the cycle is repeated.

Going back to FIG. 1, one can realize that if no other coating or treatment is needed, the apparatus is complete. However, in the case that the article is an egg-yolk disk, and it is important that a second coating/treatment is necessary in order to form a membrane, for example, around the yolk disk, a second vessel 68 is needed. The second vessel or second wetting station 68 may be a simple tank containing a second coating liquid. According to the instant invention, it is highly preferable, that the second vessel or second wetting station 68 is a device as described in detail in U.S. Pat. Nos. 5,589,208 and 5,589,218, and shown in the middle portion of FIG. 12 in the same patents.

In brief, the second wetting station 68 comprises a vat 70 which communicates with a substantially horizontal corridor 72, through an opening 74, over which there is preferably disposed a flow restrain 76. The length of the corridor 72 is preferably in the range of about ½ to about 3 feet. The second wetting station 68, further comprises a pump 76, adaptable to provide the vat 70 with second liquid 77 contained in a second tank 78, through line 80. There is also provided a liquid curtain generator 82 as described in detail in U.S. Pat. Nos. 5,589,208 and 5,589,218.

The liquid curtain generator 82 is provided with second liquid 77 from the tank, though an additional line (not shown) and pump (not shown). The liquid curtain generator 82 is preferably positioned over the corridor 72.

The second vessel or wetting station 68 also comprises a separator 84 comprising one or more, preferably 2 to 4, and more preferably three sliding plates 86, such as 86a, 86b, and 86c, as described in detail in U.S. Pat. Nos. 5,589,208 and 5,589,218.

The operation of this embodiment will be described with an example involving the formation of a membrane around an extruded egg-yolk in the form of a disk. Thus, referring to FIGS. 1 to 4, the belt 24 is initially at the lower position 38. A yolk 20 is cut by the wire 66 and falls into the first coating liquid 18 in the inner space 16 of the first vessel 14. A signal is given from the dispenser 12 to the controller 58 that a yolk 20 has been cut and fallen into the first coating liquid 18. In turn, the controller 58 activates the air cylinder 50 so that the piston 56 is pushed outwardly, and causes the belt side supports 46, and the belt 24 to move from the lower position 38 to the upper position 36.

As the belt 24 is moving upward from the lower position 38 to the higher position 36, it catches the yolk 20 and elevates it upward and toward its upper end 26. The speed of the belt is preferably arranged to be high enough, so that when the belt 24 assumes later the lower position 38, the yolk 20 has already moved by the belt 24 outside the first coating liquid 18. The existence of the perforated middle portion 42, combined with the substantially non-perforated belt side portions 44, of the belt 24 is very important, because as the belt moves from the lower position 38 to the upper position 36, there is a surge of liquid through the perforations of the middle portion 42, forcing the yolk to move toward the middle portion of the belt, so that said yolk stays away from the belt side supports 46, and/or the first vessel side portions 22. In the absence of such an arrangement or an equivalent arrangement, the yolk may find itself very often to be rubbing against one of the belt side supports 46 or one of the first vessel side supports 22, or both, which in most occasions would result in incomplete coating, and/or damage to the integrity of the yolk 20. If, for example, the yolk is to be coated with a cross-linker, such as calcium chloride solution, for example, a membrane which forms after the yolk comes in contact with a cross-linkable gum, such as sodium alginate for example, will be incomplete, and it will allow the yolk to run at a later stage, such as for example warming, cooking, etc.

As the dispenser 12 is ready to dispense a new yolk 20, a signal is given to the controller 58 through lines 62, informing the controller 58 that a new yolk is ready to be dispensed. In turn, the controller 58 de-activates, or otherwise affects the air cylinder 50 so that the piston 56 is pulled inwardly, and causes the belt side supports 46, and the belt 24 to move from the upper position 36 to the lower position 38. When the new yolk has been cut and fallen into the first coating liquid 18, a signal is given again from the dispenser 12 to the controller 58 that a yolk 20 has been cut and fallen into the first coating liquid 18. In turn, the controller 58 activates again the air cylinder 50 so that the piston 56 is pushed outwardly, and causes the belt side supports 46, and the belt 24 to move from the lower position 38 to the upper position 36. The above sequence is then repeated, so that the coating system continues to operate.

Each of the yolks 20 goes over roll 32 at the upper end 26 of the belt 24 and falls into a second vessel or wetting station 68 containing a second coating liquid 77, which in the case of the present example is a solution of sodium alginate. The operation of the second vessel or wetting station is described in great detail in U.S. Pat. Nos. 5,589,208 and 5,589,218. In brief, the yolk falls into a stream of second coating liquid 77 in a substantially flat corridor 72, where it is wetted with second coating liquid 77 over the first coating liquid 18 around the yolk 20. In the case of the present example, the yolk having a relatively thin coating of a cross linker, such as a solution of calcium chloride for example, now comes in contact with a solution of a cross-linkable gum, such as sodium alginate for example, and a cross-linked membrane is formed around the yolk 20. To ensure that the yolk comes fully in contact with the second coating liquid 77, a liquid curtain of second coating liquid 77 is utilized by means of the liquid curtain generator 82.

The stream of second coating liquid coating 77 on the substantially flat corridor 72 forces the yolk onto the separator 84, which separator comprises sliding plates 86a, 86b, and 86c (86 collectively). As the yolk slides down over these sliding plates, the excess of second coating liquid returns to the tank 78, through open spaces 88, while the yolk 20 with the membrane around leaves the system, by falling for example into a cup, in which cup, egg-white may be added at a later stage to form an egg product having an integral yolk within the egg-white, and which product may be cooked as a sunny-side-up, or over-easy, or poached, and the like, for example.

Of course, this invention does not require the second vessel or wetting station 68 in cases where a single coating is only required.

Examples demonstrating the operation of the instant invention have been given for illustration purposes only, and should not be construed as limiting the scope of this invention in any way. In addition it should be stressed that the preferred embodiments discussed in detail hereinabove, as well as any other embodiments encompassed within the limits of the instant invention, may be practiced individually, or in any combination thereof, according to common sense and/or expert opinion. These combinations also lie within the realm of the present invention. Furthermore, any attempted explanations in the discussion are only speculative and are not intended to narrow the limits of this invention.

What is claimed is:

1. An apparatus for coating an article, the apparatus comprising:
    an article dispenser;
    a first vessel having an inner space for containing a first coating liquid, the first vessel being in such spatial relation to the article dispenser so as to accept the article within the inner space after the article is dispensed from the article dispenser;
    a belt at least partially disposed over the first vessel; and
    a belt synchronizer for synchronizing the belt with the article dispenser in a manner that
    (a) when the article dispenser dispenses the article, the belt is at least partially immersed in the inner space,
    (b) after the dispenser has dispensed the article and said dispenser is being prepared to dispense a new article, the belt is lifted so as to transfer the article outside the inner space,
    (c) the belt is immersed again into the inner space before the dispenser dispenses the new article, and
    (d) the belt repeats (b), (c), and (d).

2. An apparatus as defined in claim 1, wherein the belt is a continuous belt.

3. An apparatus as defined in claim 2, wherein the belt has an upper end and a lower end, the upper end being disposed outside the inner space, the lower end being synchronized with the article dispenser in a manner that
    (a) when the article dispenser dispenses the article, the lower end is immersed in the inner space,
    (b) after the dispenser has dispensed the article and said dispenser is being prepared to dispense a new article, the lower end is lifted so as to transfer the article toward the upper end, outside the inner space,
    (c) the lower end is immersed again into the inner space before the dispenser dispenses the new article, and
    (d) the lower end repeats (b), (c), and (d).

4. An apparatus as defined in claim 3, wherein the belt has perforations.

5. An apparatus as defined in claim 4, wherein the belt has a middle portion and two belt side portions, the perforations being located in the middle portion, the two belt side portions being substantially free of perforations.

6. An apparatus as defined in claim 5, wherein the first vessel has a front end, a back end and two first vessel side portions, the apparatus further comprising belt side supports, and wherein the belt side portions are in close proximity with the belt side supports, and the belt side supports are in close proximity with the first vessel side portions at least in the region of the inner space.

7. An apparatus as defined in claim 1, wherein the first vessel has a front end and a back end, the front end having a lower volume capacity than the back end.

8. An apparatus as defined in claim 3, wherein the first vessel has a front end and a back end, the front end having a lower volume capacity than the back end.

9. An apparatus as defined in claim 5, wherein the first vessel has a front end and a back end, the front end having a lower volume capacity than the back end.

10. An apparatus as defined in claim 6, wherein the front end of the first vessel has a lower volume capacity than the back end of the first vessel.

11. An apparatus as defined in claim 3, wherein the upper end of the belt is pivoted.

12. An apparatus as defined in claim 4, wherein the upper end of the belt is pivoted.

13. An apparatus as defined in claim 5, wherein the upper end of the belt is pivoted in the vicinity and ahead of the front end of the first vessel.

14. An apparatus as defined in claim 6, wherein the upper end of the belt is pivoted in the vicinity and ahead of the front end of the first vessel.

15. An apparatus as defined in claim 7, wherein the upper end of the belt is pivoted in the vicinity and ahead of the front end of the first vessel.

16. An apparatus as defined in claim 8, wherein the upper end of the belt is pivoted in the vicinity and ahead of the front end of the first vessel.

17. An apparatus as defined in claim 9 wherein the upper end of the belt is pivoted in the vicinity and ahead of the front end of the first vessel.

18. An apparatus as defined in claim 10, wherein the upper end of the belt is pivoted in the vicinity and ahead of the front end of the first vessel.

19. An apparatus as defined in claim 1, further comprising a second vessel disposed in front of the first vessel for containing a second coating liquid, the second vessel being adapted to accept the article after said article has been transferred outside the inner space of the first vessel.

20. An apparatus as defined in claim 3, further comprising a second vessel disposed in front of the first vessel for containing a second coating liquid, the second vessel being adapted to accept the article after said article has been transferred outside the inner space of the first vessel.

* * * * *